Figure 1:
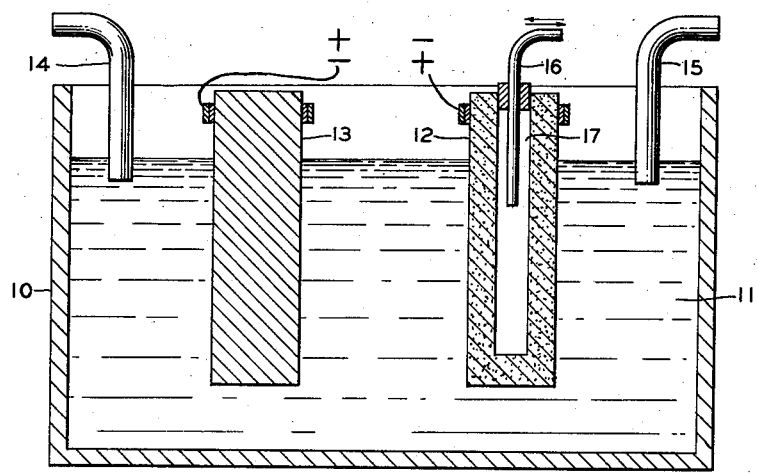

Feb. 17, 1942.  G. W. HEISE ET AL  2,273,795
ELECTROLYTIC PROCESS
Filed Dec. 31, 1936

INVENTORS
GEORGE W. HEISE
ERWIN A. SCHUMACHER
BY
ATTORNEY

Patented Feb. 17, 1942

2,273,795

UNITED STATES PATENT OFFICE 2,273,795

ELECTROLYTIC PROCESS

George W. Heise, Rocky River, and Erwin A. Schumacher, Lakewood, Ohio, assignors to National Carbon Company, Inc., a corporation of New York Application December 31, 1936, Serial No. 118,472

13 Claims. (Cl. 204—98)

The invention relates to electrolytic processes wherein an impressed electric current is passed through a cell having electrodes immersed in an aqueous electrolyte.

In its broad aspect, the invention comprises the use of porous electrodes to achieve one or more of the following objects:

(a) To decrease the voltage drop through, and the power consumption of, the cell;

(b) To provide for the introduction of one or more chemical reactants into the cell;

(c) To provide a situs for desired chemical reactions;

(d) To provide for the removal of one or more products from the cell, in some instances in relatively concentrated form, and (e) To increase the useful life of the electrodes.

The heart of the invention lies in the provision of an electrode having an effective surface area in contact with the electrolyte many times greater than the apparent or superficial area of contact, the body of the electrode being permeable either to gases alone or to both gases and liquids. Such an electrode consists, for example, of a porous or foraminous body of conductive material, preferably carbon, the dimensions of the pores and inner passages being extremely minute, as further described below.

We are aware that it has been heretofore proposed to use carbon electrodes possessing some permeability to fluids, in various electrolytic processes in an attempt to achieve one or more of the above objects; but none of these proposals has been capable of satisfactory practical application. We have found that many of the difficulties experienced by prior workers may be overcome by the use of an improved electrode material. Specifically, we have found that the electrode material should have a porosity above 35% (preferably between 40% and 70%, calculated as follows: % porosity=100 real density—apparent density)÷real density. Further, the electrode material should have an air permeability above 15, and preferably above 30. Whenever used herein and in the appended claims, the term "air permeability" means the number of cubic inches of air per minute passing through one square inch cross-section of electrode material, when air at a pressure of one pound per square inch is blown through a block of the material one inch thick. The following table shows, for purposes of comparison, the porosity and permeability of ordinary electrode carbons (types 1, 2, and 3) and of the special electrode carbons included in this invention (types 4, 5, 6, and 7).

| Type | Porosity | Air permeability |
|---|---|---|
|  | Percent |  |
| 1 | 25 | 2 |
| 2 | 28 | 7 |
| 3 | 33 | 2 |
| 4 | 60 | 20 |
| 5 | 57 | 30 |
| 6 | 40 | 120 |
| 7 | 42 | 600 |

We have also found that the pores of the electrode material should be relatively minute and uniformly distributed, and not large, scattered voids and fissures. Material having the latter kind of pores might be described as "leaky" rather than "porous." The relative uniformity of distribution of the pores in the two kinds of materials may be distinguished by a simple test: if air is forced through a thin block of the material under water, at about the minimum air pressure required to obtain bubbles in the water, the "porous" material gives forth a cloud of small bubbles over its entire surface, while the "leaky" material gives a number of separate streams of bubbles issuing from the larger fissures and voids.

Another test for uniformity of porosity of these materials comprises determining the flow of a viscous liquid, such as a concentrated aqueous solution of cane sugar, under a moderate pressure, for instance a head of about six inches, through a thin (e. g. one-eighth inch) section of the material. Any relatively large fissures permit flow of the solution and are thereby made evident.

Porous electrode material within this invention may be made from comminuted solid carbonaceous material (for example, coke, graphite, or charcoal) and a porous carbonaceous binder (for instance, baked tar or pitch). Suitable methods for making such electrode material are described in U. S. Patent 1,988,478, issued on January 22, 1935, to B. E. Broadwell and L. C. Werking.

In some processes the kind of solid carbon chosen for the electrode material will make little or no difference; in other processes it will be desirable or necessary to take advantage of the fact that graphite has a higher oxygen overvoltage than coke, and that coke has a higher oxygen overvoltage than charcoal. Otherwise stated, in a given instance either a high or a low overvoltage may be influential, and the overvoltage characteristics may be accordingly controlled by a proper choice of electrode material.

Figure 2:
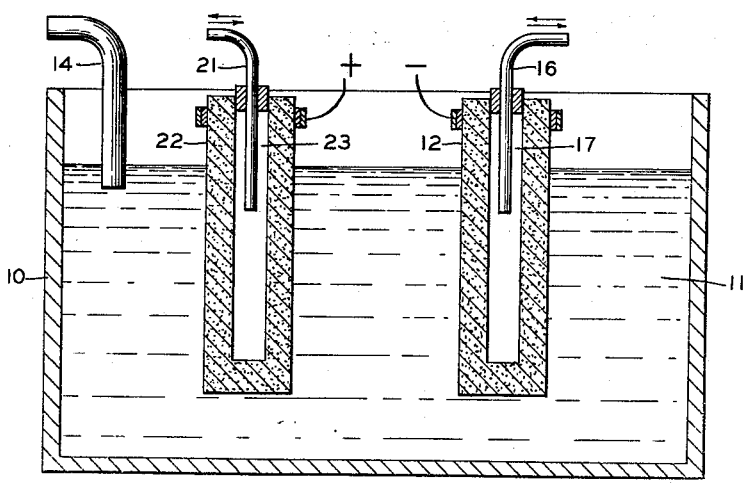

The practical application of the above-described new electrode material to electrolytic processes, according to this invention, will be described in connection with the attached drawing, in which Fig. 1 represents diagrammatically in vertical cross-section an electrolytic cell container 10 containing an electrolyte 11 in which are immersed a porous electrode 12 and a nonporous electrode 13, and Fig. 2 represents diagrammatically in vertical cross-section an electrolytic cell similar to that shown in Fig. 1 except that it contains two porous electrodes 12 and 22.

The device illustrated in Figure 1 may be used in cases where it is desired to introduce one or more reactants into the cell, or to remove one or more reaction products from the cell, through only one electrode.

Examples of processes in which a reactant may advantageously be introduced into the cell through a single electrode 12 involve the electrowinning of copper and zinc with the assistance of sulfur dioxide acting as an anodic depolarizer and leach-liquor regenerator.

Oxydic copper ores (or dead roasted sulfide ores of copper) may be leached with a dilute solution of sulfuric acid, yielding an acid solution containing dissolved copper sulfate. The resulting solution may be electrolyzed to yield copper at the cathode and sulfuric acid at the anode, the voltage required for electrolysis being usually between 2.1 and 2.3 volts, depending upon the anode material. It has been proposed to reduce the required voltage by introducing an anodic depolarizer, such as sulfur dioxide; but no entirely successful means for doing this has been provided. According to the present invention, depolarization may be accomplished by introducing gaseous sulfur dioxide into the cell through a porous anode 12, as shown in Figure 1. The rate of addition of sulfur dioxide is preferably so adjusted that little or no unoxidized gas remains in the electrolyte within the cell. Experiments have shown that, when the porous carbon electrode described above is used, a cell operating voltage of approximately 0.6 to 1 volt may be attained. It is necessary, of course, to prevent flooding of the electrode well 17 with electrolyte in this instance, and this may conveniently be accomplished by waterproofing the inner surface of the well 17, using the waterproofing treatment described, for example, in our Patent 2,017,280. Under some circumstances it will be desirable to use waterproofing solutions which are considerably more concentrated than those mentioned as specific examples in this patent.

In the electrolytic process described above, the copper-containing liquor 11 may be introduced into the cell 10 through a conduit 14; the gaseous sulfur dioxide may be introduced through a conduit 16 and the porous anode 12, preferably provided with an inner well 17; the copper is deposited at the cathode 13; and regenerated leach liquor (exhausted electrolyte) may be removed from the cell through a conduit 15.

Another method of introducing the sulfur dioxide into the anolyte, and this latter method enjoys several advantages over the one just described, including the advantage that the anode is not waterproofed, comprises dissolving the sulfur dioxide in a portion, or all, of the fresh, copper-containing electrolyte, introducing the resulting solution into the cell 10 through the conduit 14, and removing the exhausted electrolyte through the anode 12 and conduit 16. Experiment has shown that this method results in a relatively low cell voltage drop of about 0.6 to 0.9 volts if a porous carbon anode is used; but has the disadvantage of permitting sulfur dioxide to escape from the surface of the electrolyte 11 into the atmosphere, thereby producing unhealthy and obnoxious working conditions in the cell room.

A third method, which we prefer over those described above, comprises dissolving sulfur dioxide in a portion, or all, of the fresh, copper-containing electrolyte; introducing the resulting solution into the cell 10 through the conduit 16 and the porous anode 12; depositing the copper at the solid cathode 13; and removing the exhausted electrolyte through a conduit 15 or 14. Experiment has demonstrated that free sulfur dioxide may readily be prevented from reaching the surface of the electrolyte 11 within the cell, and that a cell voltage drop of only about 0.6 to 0.9 volts may be attained, if a porous carbon anode is used.

Basic and oxydic ores of zinc, such as smithsonite, zincite, and calamine, or dead roasted sulfides, may be leached with a dilute sulfuric acid solution to yield an acid solution containing dissolved zinc sulfate, and this liquor may be electrolyzed to yield zinc metal, in a manner analogous to the treatment of oxydic copper ores. The voltage drop through the cell is usually about 3.3 to 3.7 volts. By the use of a porous carbon anode, and the introduction of sulfur dioxide in the first and third ways described above in connection with copper electrolysis, the voltage drop through the cell may be lowered to about 2 to 3 volts, as we have determined by experimentation.

Various attempts have been made in the past to recover copper from reduced ores by leaching with cupric chloride and subsequently electrolyzing the leach liquor. In the so-called Hoepfner process, ore leaching proceeds as follows:

Sodium chloride is added to the solution to keep the cuprous chloride in solution. Upon electrolysis, part of the copper is deposited at the cathode and part is oxidized at the anode to regenerate the leach liquor:

Deposition of the copper from a cuprous salt requires one-half the energy required to deposit it from a cupric salt. Moreover, the cuprous chloride acts as an anodic depolarizer, thereby reducing the required cell voltage. However, heretofore, difficulties with diaphragms and low current efficiencies have hindered the commercial development of the process.

We have discovered by experiment that the porous carbon electrode of this invention may be utilized to overcome the above-described difficulties. Referring to Figure 1, the copper-rich leach liquor 11, containing cuprous chloride and sodium chloride, may be introduced into a cell 10 through a conduit 14; copper may be deposited at a solid cathode 13; and anolyte containing the cupric chloride formed during the depolarization reaction may be withdrawn through a porous carbon anode 12 and a suitable conduit 16. A voltage drop through the cell as low as 0.6 volt, and a current efficiency better than 90%, may be obtained.

The invention is not limited to processes involving only inorganic reactants. For instance, if the electrolyte 11 contains a halide, such as potassium bromide, and if an unsaturated aliphatic hydrocarbon, ethylene for instance, is passed into the cell 10 through a porous carbon anode 12, aliphatic halides and halohydrins may be formed: ethylene dibromide and bromhydrin in the example cited.

The specific examples described above illustrate typical processes wherein we employ a porous anode and a solid cathode. It will frequently be desired, of course, to use a solid anode and a porous cathode. For instance, the latter arrangement may be used to advantage in the cathodic reduction of nitrobenzene to p-aminophenol. In such a process, a cell 10 may be used which includes a solid anode 13 and a porous carbon cathode 12, which are immersed in a suitable electrolyte 11, for instance a normal solution of sulfuric acid. Nitrobenzene may be introduced into the cell through the cathode 12. At the cathode, the nitrobenzene is reduced cathodically to p-aminophenol which rises to the top of the electrolyte where it may be collected and removed.

Another process employing a porous cathode comprises electrolyzing sodium chloride brine in a cell 10 and passing nitric acid into the cell through a porous carbon cathode 12. Nitric acid depolarizes the cathode to form nitric oxide, and the cell reactions may be written:

$$6NaCl + 8HNO_3 = 6NaNO_3 + 2NO + 3Cl_2 + 4H_2O$$

Provision may be made to collect the chlorine and nitric oxide separately, and the nitric oxide may readily be oxidized and converted to nitric acid in known manner. Whereas ordinary methods of brine electrolysis require about 3.6 volts, the use of nitric acid depolarization permits operation at about 1.8 volts.

Other embodiments of our invention involve the use of a porous carbon anode and a porous carbon cathode, as illustrated in Figure 2. For instance, a sodium sulfate solution may be electrolyzed to produce sulfuric acid at the anode and sodium hydroxide at the cathode, according to the equation:

$$Na_2SO_4 + 2H_2O = 2NaOH + H_2SO_4$$

The sodium sulfate solution may be placed in a cell 10 through a suitable conduit 14; anolyte containing the sulfuric acid may be withdrawn through a porous carbon anode 22 and a conduit 21; and catholyte containing the caustic soda may be withdrawn through a porous carbon cathode 12; thereby eliminating the two diaphragms which would otherwise be required.

Another example of processes in which two porous carbon electrodes may be used advantageously is the electrolytic oxidation of potassium ferrocyanide to potassium ferricyanide. In this process, the ferrocyanide solution may be introduced through a conduit 14 into the cell 10; anolyte containing potassium ferricyanide may be withdrawn through a porous carbon anode 12 provided with a well 17 and a conduit 16; and catholyte containing potassium hydroxide and unoxidized ferrocyanide may be withdrawn through a porous carbon cathode 22 provided with a well 23 and a conduit 21. The overall reaction may be represented as:

$$2K_4Fe(CN)_6 + 2H_2O = 2K_3Fe(CN)_6 + 2KOH + H_2$$

The use of two porous electrodes not only eliminates the need for diaphragms, but also provides a continuous process. A further advantage is that the ferricyanide is obtained in a concentration greater than that of the ferrocyanide. We have found by experiment that an anodic oxidation efficiency of 80% or better is obtainable.

A further example is provided in the process wherein sulfur dioxide is passed through a porous anode into an electrolyte and chlorine is passed through a porous cathode into the electrolyte. Sulfuric acid is formed at the anode, and hydrochloric acid at the cathode. This process may be operated to deliver power, and when current from an external source is introduced the rate of output of products is increased.

Other embodiments of the invention are contemplated by us. For instance, polarization at either or both of the electrodes, which increases the resistance and opposes the flow of electric current, may be diminished by passing a fluid, which may be either a liquid or a gas, through the porous electrode into the cell or by withdrawing electrolyte from the cell through the porous electrodes, thereby mechanically decreasing the said concentration of material next to the electrode.

In certain processes, for instance in the electrolysis of sodium chloride brine to produce chlorine at the anode, it is desired to maintain a maximum concentration of fresh electrolyte in the anolyte. By passing brine through a porous anode 12 (Figure 1) into a cell 10 containing the electrolyte 11 and a cathode 13, the anolyte is continually fed with fresh brine, thereby minimizing the formation of oxygen or oxygenated chlorine products and thereby also minimizing the rate and severity of the attack on the anode material. Furthermore, if air or oxygen is blown through the porous carbon cathode into the cell, depolarization of the cathode will reduce the power consumption of the cell; alternatively, catholyte containing the caustic soda may be withdrawn through a porous cathode, thereby eliminating the necessity for the customary diaphragm.

It will be observed that in a number of the processes given as examples herein the attack and disintegration of electrode material by the electrolyte, or products or by-products of electrolysis, is prevented or hindered either by rapid removal of the corrosive material from contact with the porous electrode, or by preventing the formation of such materials by a depolarization reaction, or by making the depolarizing substance act as the electrochemically active electrode. Therefore, it has been found that the porous carbon electrodes are characterized by a long service life, even in many processes wherein carbon and graphite electrodes have not been used successfully heretofore.

It will also be observed that, whenever a material is introduced into the cell through a porous electrode, the electrode serves as an efficient distributor of such material. An effect of the extended nature and chemical composition of the surface of these porous carbon electrodes which is often observed is to promote certain reactions, and one beneficial practical result is an increased efficiency of depolarization. Thus, in a given instance the porous carbon electrode may serve several functions simultaneously to achieve the general objects of the invention.

Although several specific processes have herein been described in detail, it will readily be understood that these descriptions are presented only by way of examples illustrating certain aspects of the invention, and that the invention is not limited to or by such examples. Furthermore, although one shape of electrode is shown in the attached drawing as an example, the invention is not limited to that or any other specific shape. For instance, under some circumstances it may be desired to provide non-porous portions in the electrode, or to adopt a special shape, in order to regulate the distribution of fluid flowing through the electrode, or for another reason. It may also be advantageous to place a porous electrode or electrodes, not provided with a central well 17 or 23, at the end or ends of the cell container 10 in such a manner that a space is left between the electrode and the container, which space may be used to serve the functions of the central well 17 or 23 described herein.

We claim:

1. An electrolytic cell comprising a container; an aqueous electrolyte within the container; a porous carbon electrode and a second electrode, both of said electrodes being in contact with said electrolyte; a source of electric current connected to said electrodes; and a conduit for fluid connected to said carbon electrode; said carbon electrode being uniformly porous and comprising solid carbon particles in a porous carbon binder having a uniform pore distribution, the porosity of said carbon electrode being between 40% and 70% and the air permeability thereof being above 30.

2. In a process of electrolyzing an aqueous electrolyte by passing an impressed electric current through the electrolyte between electrodes in contact therewith, and effecting a reaction between a fluid reagent and a product of electrolysis, the improvement which consists in providing as a situs for such reaction a uniformly porous carbon electrode of comminuted solid carbon in a uniformly porous carbon binder, the porosity of said electrode being between 35% and 70% and the air permeability thereof being above 30; and contacting said fluid reagent with said fluid reagent with said product of electrolysis, and thereby effecting said reaction, in said situs.

3. A process of depositing metal from an aqueous electrolyte containing a salt of said metal, which comprises passing said electrolyte into a cell containing a cathode and a porous anode, said anode having a porosity between 35% and 70% and an air permeability above 30 and comprising comminuted solid carbon material embedded in a porous carbon binder having uniformly distributed pores; passing an electric current through the electrolyte between the cathode and anode; and passing through the anode into the electrode a depolarizing agent.

4. A process of depositing a metal from an aqueous solution of a sulfate of said metal which comprises passing said electrolyte into a cell containing a cathode and a porous anode, said anode having a porosity between 40% and 70% and an air permeability above 30 and comprising comminuted solid carbon material embedded in a porous carbon binder having uniformly distributed pores; passing an electric current through the electrolyte between the cathode and anode; and passing sulfur dioxide through the anode into the cell.

5. A process of depositing copper from an aqueous electrolyte containing cupric sulfate which comprises passing the electrolyte into a cell containing a cathode and a dry porous anode, the anode having a porosity between 35% and 70% and an air permeability above 30 and comprising comminuted solid carbon material embedded in a porous carbon binder having uniformly distributed pores; passing an electric current through the electrolyte between the cathode and anode; and passing through the anode into the electrolyte a gaseous depolarizing agent.

6. A process of depositing copper from an aqueous electrolyte containing cupric sulfate which comprises passing the electrolyte into a cell containing a cathode and a dry porous anode, the anode having a porosity between 40% and 70% and an air permeability above 30 and comprising comminuted solid carbon material embedded in a porous carbon binder having uniformly distributed pores; passing an electric current through the electrolyte between the cathode and anode; and passing through the anode into the electrolyte sulfur dioxide.

7. A process of depositing copper from an aqueous electrolyte containing cupric sulfate which comprises passing the electrolyte into a cell containing a cathode and a porous anode, the anode having a porosity between 40% and 70% and an air permeability above 30 and comprising comminuted solid carbon embedded in a porous carbon binder having uniformly distributed pores; passing an electric current through the electrolyte between the cathode and anode; and passing through the anode into the electrolyte sulfur dioxide dissolved in electrolyte.

8. Method of conducting oxidation-reduction reactions which comprises passing an electrolyte into an electrolytic cell containing electrodes at least one of which is porous and has a porosity between 35% and 70% and an air permeability above 30 and comprises comminuted solid carbon material embedded in a porous carbon binder having uniformly distributed pores; passing an electric current through the electrolyte between the cathode and anode to produce oxidizing conditions at the anode and reducing conditions at the cathode; and passing material capable of entering an oxidation-reduction reaction through said porous electrode or electrodes.

9. Method of conducting organic oxidation-reduction reactions which comprises passing an electrolyte into an electrolytic cell containing electrodes, at least one of which electrodes is porous and has a porosity between 40% and 70% and an air permeability above 30 and comprises comminuted solid carbon material embedded in a porous carbon binder having uniformly distributed pores; passing an electric current through the electrolyte between said electrodes to produce oxidizing conditions at the anode and reducing conditions at the cathode; and passing through said porous electrode or electrodes, into the cell, organic material capable of entering a reaction of the oxidation-reduction type.

10. Process of making organic halogen compounds which comprises passing a solution of an electrolyzable halide into an electrolytic cell containing a cathode and a porous anode, the anode having a porosity between 35% and 70% and an air permeability above 30 and comprising comminuted solid carbon material embedded in a porous carbon binder having uniformly distributed pores; passing an electric current through the electrolyte between the cathode and anode, thereby electrolyzing the halide; and passing an organic material into the cell through the porous anode.

11. Process of making organic halogen compounds which comprises passing a solution of an electrolyzable halide into an electrolytic cell containing a cathode and a porous anode, the anode having a porosity between 40% and 70% and an air permeability above 30 and comprising comminuted solid carbon material embedded in a porous carbon binder having uniformly distributed pores; passing an electric current through the electrolyte between the cathode and anode, thereby electrolyzing the halide; and passing into the cell through the porous anode an organic material capable of reacting with halogens.

12. Process for electrolyzing halide brine which comprises passing the brine into an electrolytic cell containing an anode and a uniformly porous cathode, the cathode having a porosity above between 35% and 70% and an air permeability above 15 and comprising comminuted solid carbon embedded in a porous carbon binder having uniformly distributed pores; passing an electric current through the electrolyte between the anode and cathode; and passing oxygen into the cell through the porous cathode.

13. Process for electrolyzing halide brine which comprises passing the brine into an electrolytic cell containing an anode and a porous cathode, the cathode having a porosity between 40% and 70% and an air permeability above 30 and comprising a comminuted solid carbon embedded in a porous carbon binder having uniformly distributed pores; passing an electric current through the electrolyte between the anode and cathode; and passing oxygen into the cell through the porous cathode.

GEORGE W. HEISE.
ERWIN A. SCHUMACHER.

CERTIFICATE OF CORRECTION.

Patent No. 2,273,795.                                        February 17, 1942.

GEORGE W. HEISE, ET AL.

It is hereby certified that error appears in the printed specification of the above numbered patent requiring correction as follows: Page 1, first column, lines 41 and 42, for "70%, calculated as follows: % porosity = 100 real" read --70%), calculated as follows: % porosity = 100 (real--; page 4, first column, line 52, claim 2, strike out "fluid reagent with said"; page 5, second column, line 2, claim 12, strike out "above"; and that the said Letters Patent should be read with this correction therein that the same may conform to the record of the case in the Patent Office.

Signed and sealed this 21st day of April, A. D. 1942.

(Seal)                                                 Henry Van Arsdale,
                                                       Acting Commissioner of Patents.